(12) United States Patent
Csonti et al.

(10) Patent No.: US 9,678,517 B2
(45) Date of Patent: Jun. 13, 2017

(54) DEVICE AND METHOD FOR IMPROVING THE RESPONSE TIME OF A TEMPERATURE CONTROL DEVICE

(71) Applicant: W.E.T. Automotive Systems, Ltd., Windsor (CA)

(72) Inventors: Sergiu Csonti, Windsor (CA); Syed Rafat Iqbal, LaSalled (CA)

(73) Assignee: GENTHERM CANADA LTD., Windsor, Ontario (CA)

( * ) Notice: Subject to any disclaimer, the term of this patent is extended or adjusted under 35 U.S.C. 154(b) by 400 days.

(21) Appl. No.: 14/104,213

(22) Filed: Dec. 12, 2013

(65) Prior Publication Data

US 2014/0180493 A1    Jun. 26, 2014

Related U.S. Application Data

(60) Provisional application No. 61/740,579, filed on Dec. 21, 2012.

(51) Int. Cl.
*G05B 13/00* (2006.01)
*G05B 15/00* (2006.01)
(Continued)

(52) U.S. Cl.
CPC ....... *G05D 23/1917* (2013.01); *B60N 2/5685* (2013.01); *G05D 23/1919* (2013.01); *G05D 23/24* (2013.01)

(58) Field of Classification Search
CPC ...................................................... G05D 23/19
(Continued)

(56) References Cited

U.S. PATENT DOCUMENTS 4,078,720 A * 3/1978 Nurnberg ............. G05D 23/275
165/202
4,849,611 A    7/1989 Whitney et al.
(Continued)

FOREIGN PATENT DOCUMENTS

JP    58-116216 A    7/1983
JP    1-81668 A    5/1989
(Continued)

OTHER PUBLICATIONS

International Search Report, Serial No. PCT/IB2013/003181, dated Jul. 9, 2014.
(Continued)

*Primary Examiner* — Mohammad Ali
*Assistant Examiner* — MD Azad
(74) *Attorney, Agent, or Firm* — The Dobrusin Law Firm, P.C.

(57) ABSTRACT

A system comprising a temperature controlled device, a primary energy source, and either or both of an electronic device and an electro-mechanical device. One or both of the electronic device and an electro-mechanical device include a secondary energy source, a switching device, a measuring device, and optionally a controller. The temperature controlled device is connected to the secondary energy source when the temperature controlled device is turned on. The measuring device measures a predetermined condition, and the switching device switches from the secondary energy source to the primary energy source when the temperature controlled device achieves the predetermined condition. The predetermined condition is achieved in about 60 seconds or less.

20 Claims, 3 Drawing Sheets

(51) Int. Cl.
| | |
|---|---|
| *G05D 23/00* | (2006.01) |
| *A47K 13/00* | (2006.01) |
| *E03D 11/00* | (2006.01) |
| *H04B 1/46* | (2006.01) |
| *H05B 3/00* | (2006.01) |
| *H05B 11/00* | (2006.01) |
| *G05D 23/19* | (2006.01) |
| *B60N 2/56* | (2006.01) |
| *G05D 23/24* | (2006.01) |

(58) Field of Classification Search
USPC .......................................................... 700/299
See application file for complete search history.

(56) References Cited

U.S. PATENT DOCUMENTS

| | | | |
|---|---|---|---|
| 4,908,498 A * | 3/1990 | Kivela | ............... G05D 23/1917 |
| | | | 219/483 |
| 5,369,247 A | 11/1994 | Doljack | |
| 6,064,037 A | 5/2000 | Weiss et al. | |
| 6,150,642 A | 11/2000 | Weiss et al. | |
| 6,703,845 B2 | 3/2004 | Stanley et al. | |
| 6,914,217 B2 | 7/2005 | Fristedt | |
| 7,141,760 B2 | 11/2006 | Howick et al. | |
| 7,205,510 B2 | 4/2007 | Howick | |
| 7,240,962 B2 | 7/2007 | Kim | |
| 7,560,670 B2 | 7/2009 | Lorenzen et al. | |
| 7,615,879 B2 | 11/2009 | Przywecki | |
| 7,741,582 B2 | 6/2010 | Howick et al. | |
| 7,801,661 B2 | 9/2010 | Masterson et al. | |
| 8,117,683 B2 | 2/2012 | Yamamoto et al. | |
| 2004/0011778 A1* | 1/2004 | Fristedt | ................ B60N 2/5685 |
| | | | 219/217 |
| 2007/0141999 A1* | 6/2007 | Przywecki | .............. B60R 16/03 |
| | | | 455/82 |
| 2008/0059089 A1* | 3/2008 | Hornick | ................ H02J 7/0031 |
| | | | 702/63 |
| 2009/0025131 A1* | 1/2009 | Yamamoto | ........... A47K 13/305 |
| | | | 4/420 |

FOREIGN PATENT DOCUMENTS

| | | |
|---|---|---|
| JP | H01-81668 | 5/1989 |
| JP | 08-076632 A | 3/1996 |
| JP | H08-076632 | 3/1996 |
| JP | 2002-43048 | 2/2002 |
| JP | 2002-043048 A | 2/2002 |
| JP | 2003-535341 A | 11/2003 |
| JP | 2005-137881 A | 6/2005 |
| JP | 2007-083026 A | 4/2007 |
| KR | 10-0384584 | 5/2003 |

OTHER PUBLICATIONS

Korean Intellectual Property Office Notice Requesting Submission of Opinion dated Feb. 9, 2016 for Application No. 10-2015-7016385.
Japan Patent Office Action dated Dec. 11, 2015 for Application No. 2015-548788.
Korea decision to grant patent for Korean patent application No. 10-2015-7016385 mailed on Jun. 28, 2016.
Japanese decision to grant patent for Japanese patent application No. 2015-548788 mailed on May 25, 2016.
Chinese Second Office Action for Chinese Application No. 201380067709.7; dated Jan. 13, 2017.

* cited by examiner

DEVICE AND METHOD FOR IMPROVING THE RESPONSE TIME OF A TEMPERATURE CONTROL DEVICE

FIELD

The present teachings generally relate to improving performance in temperature controlled device and specifically improving the rate at which a heating device heats up.

BACKGROUND

The present teachings are predicated upon providing a temperature controlled device (e.g., a heating and/or cooling system) where the rate at which the heating device provides heat and/or cooling to a user is improved. Generally, a heating system and/or heating and cooling systems for providing thermal comfort to a vehicle seat include a heater and/or fan. Typically, these heaters are resistive heaters installed within the vehicle seat. Some non-limiting examples of resistive heaters that are employed are a lay wire heater; a positive temperature coefficient heater (PTC); carbon strands; carbon sheets, sheets and/or strands including carbon, nickel, or both; or any other type of heating system that becomes hot when energy is applied. However, these heaters, when cold, take time to: become hot, heat the surrounding elements, penetrate one or more layers, or a combination of these so that an occupant feels heat from the heater or when the cooling devices are hot take time to provide cooling. The time it takes for an occupant to experience warmth increases as the ambient temperature of the heater, the seat, the air, or a combination thereof, before the heater is turned on, become colder or conversely the time it takes for an occupant to experience cooling increases as the ambient temperature of the cooling device, the seat, the air, or a combination thereof, before the cooling device is turned on, become hotter. Existing systems have a ramp up from the time they are turned on until an occupant experiences an increase in heating and/or cooling. For occupants with a drive of only a few miles the vehicle seat may not even become warm and/or cool by the time the occupant reaches their desired location. Notwithstanding what exists today, car manufacturers and vehicle owners continue to seek heated seats that heat up faster and cooling seats that cool faster.

It would be attractive to have a heating system that rapidly heats up and/or a cooling system that rapidly cools so that a user experiences a temperature change shortly after the heater is turned on. It would be attractive to have a heating device and/or cooling device that reaches 70 percent of its maximum temperature in 60 seconds or less. Examples of attempts to boost power may found in U.S. Pat. Nos. 4,849,611; 5,369,247; 6,914,217; 7,615,879; and 7,801,661 all of which are incorporated by reference herein for all purposes.

What is needed is a temperature controlled device that rapidly reaches a temperature where the user experiences a heating and/or cooling sensation. What is further needed is a heating system that rapidly heats up while monitoring the temperature of the heater so that the heater is not damaged due to the rapid heating. It would be attractive to have a temperature controlled device that reaches 70 percent of its maximum temperature in 60 seconds or less, preferably 85 percent of its maximum temperature in 60 seconds or less, more preferably about 100 percent or more of its maximum temperature in 60 seconds or less.

SUMMARY

The present teachings meet one or more of these needs by providing: a system comprising: (a) a temperature controlled device; (b) a primary energy source; (c) an electronic device, an electro-mechanical device, or both comprising: (i) a secondary energy source; (ii) a switching device; (iii) a measuring device; and (iv) optionally a controller; wherein the temperature controlled device is connected to the secondary energy source when the temperature controlled device is turned on; wherein the measuring device measures a predetermined condition, and the switching device switches from the secondary energy source to the primary energy source when the temperature controlled device achieves the predetermined condition; and wherein the predetermined condition is achieved in about 60 seconds or less.

The present teachings provide: a method comprising: (a) applying a secondary energy source to a temperature controlled device in a system; (b) monitoring one or more conditions of the temperature controlled device; (c) disconnecting the temperature controlled device from the secondary energy source when the one or more of the conditions achieves a predetermined value; (d) connecting the temperature controlled device to a primary energy source so that the temperature controlled device continues to control temperature; wherein temperature controlled device are disconnected from the secondary energy source after about 60 seconds or less; and wherein the temperature controlled device is a self-regulating heating device; the temperature controlled device is connected to a controller that regulates the temperature of the temperature controlled device; or a combination of both so that when the temperature controlled device is connected to the primary energy source the temperature controlled device maintains a pre-set temperature, a user selected temperature, or both.

The present teachings meet one or more of the present needs by providing a heating system comprising: (a) a heating device; (b) an electronic device, an electro-mechanical device, or both comprising: (i) a secondary constant energy source, an secondary amplified energy source, or both; (ii) a primary constant energy source; (iii) a mechanical switching device, an electrical switching device, or both; (iv) a measuring device; and (v) optionally a controller; wherein the heating device is connected to the secondary constant energy source, the secondary amplified energy source, or both when the heating device is turned on; wherein the measuring device measures a predetermined condition, and the mechanical switching device, the electrical switching device, or both switches from to the secondary constant energy source, the secondary amplified energy source, or both to the primary constant energy source when the heating device achieves the predetermined condition; and wherein the predetermined condition is achieved in about 60 seconds or less.

Another unique aspect of the present teachings envisions a method comprising: (a) applying a constant energy source or an amplified energy source to a heating device in a heating system; (b) monitoring one or more conditions of the heating device; (c) disconnecting the heating device from the constant energy source or the amplified energy source when the one or more of the conditions achieves a predetermined value; (d) connecting the heating device to a different constant energy source so that the heating device continued to be heated; wherein heating device is disconnected from the constant energy source or the amplified energy source after about 60 seconds or less; and wherein the heating device is self-regulating, the heating device is connected to a controller that regulates the temperature of the heater, or both so that when the heating device is connected to the different constant energy source the heating device maintains a pre-set temperature, a user selected temperature, or both.

The teachings herein surprisingly solve one or more of these problems by providing a temperature controlled device that rapidly reaches a temperature where the user experiences a heating and/or cooling sensation. The teachings herein provide a heating system that rapidly heats up while monitoring the temperature of the heater so that the heater is not damaged due to the rapid heating. The teachings herein provide a temperature controlled device that reaches 70 percent of its maximum temperature in 60 seconds or less, preferably 85 percent of its maximum temperature in 60 seconds or less, more preferably about 100 percent or more of its maximum temperature in 60 seconds or less.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a system that may be used with and/or include any temperature controlled device (e.g., heating device or cooling device) so that when an energy source (e.g., power source, current source, voltage source) is applied the temperature controlled device changes temperature and provides heat and/or cool to adjacent structures, people, or both. Preferably, the temperature controlled device discussed herein may be any resistive heating device. Some non-limiting examples of heaters that may be used with the teachings herein are carbon based heaters, wire based heaters (e.g., lay wire made of metal such as copper, gold, silver, or a combination thereof); positive temperature coefficient heaters (i.e., PTC); negative temperature coefficient heaters (i.e., NTC); carbon filaments heaters; carbon sheets; sheets and/or strands including carbon, nickel, or both; the like; or a combination thereof. The heating devices as discussed herein may be a thermoelectric device and/or Pelletier device. Additional types of heating devices that may be used with the teachings herein may be gleaned from the teachings herein including those of U.S. Pat. No. 7,741,562 (e.g., Column 1, lines 50-Column 2; lines 36 and FIGS. 1-4) U.S. Pat. No. 7,205,510 (e.g., Column 1; lines 35-57 and Column 2; line 45 through column 4; line 6 and FIGS. 1-5); U.S. Pat. No. 6,064,037 (e.g., Column 2, line 54 through Column 4; line 39); U.S. Pat. No. 6,150,642 (e.g., Column 1, line 50 through Column 5, line 12 and FIGS. 1-6); U.S. Pat. No. 7,141,760 (e.g., Column 1, line 33 through Column 7, line 42 and FIGS. 1-4); and U.S. Pat. No. 7,560,670 (e.g., Column 1, line 40 through Column 6, line 11 and FIGS. 1-3) all of which are incorporated herein for the teachings regarding different types of heating devices that may be used with the teachings herein. Some of the heating devices that may be used with the system herein include positive temperature coefficient characteristics (PTC). For example, if a constant voltage is applied the resistance of the PTC heater will increase so that a further increase in temperature is prevented. The system as discussed herein may be: incorporated into the heating device, located proximate to the heating device, located at a remote location from the heating device, located proximate to a cooling device, or a combination thereof.

The cooling device as discussed herein may be any cooling device that provides cooling when the cooling device contacts another surface or a user. The cooling device may be an electric cooling device. The cooling device may cool a fluid and the fluid is circulated to provide cooling. The cooling device may be a thermoelectric device, a Peltier device, a fan, or a combination of a fan and a thermoelectric device and/or Peltier device. The cooling device may be used to provide heating and cooling. The cooling device may be located proximate to a blower and/or fan for moving a cooled fluid. The cooling device may only be a fan. The fan may be used to push a fluid towards an occupant and/or pull air away from an occupant. The fan speed may be increased by a secondary energy source so that increased heating and/or cooling is generated in a starting phase of the cooling device. The fan speed when increased may be used with a thermoelectric device or without a thermoelectric device. The cooling device when energy is applied may cool a fluid that is circulated to device that is in contact with a component, a user, or both. The cooling device may be part of a system.

The system (e.g., a temperature control system, a heating system, a cooling system, or a combination thereof) as discussed herein may be the combination of a temperature controlled device (e.g., the heating device, the cooling device, or both), instrumentation, the energy source, a power booster, or a combination thereof discussed herein that are electrically connected. The system as discussed herein may be incorporated into one or more components. The system may be part of a household device (e.g., heating or cooling pad), a vehicle heating device, or a combination thereof. The household heating device may function for therapeutic use such as to heat a muscle, a chair, the like, or a combination thereof. The system when used in a vehicle maybe used to provide temperature control to virtually any part of the automobile that an occupant contacts such as an arm rest, door panel, shifter, steering wheel, seat, head rest, floor board, headliner, heated/cooled bin, console, dashboard, footdwell or a combination thereof.

The system may include one or more of the following: a temperature controlled device, a heating device, a cooling device, a timing device (e.g., a timing relay), a temperature controlled device (e.g., a temperature relay), a resistance sensor (e.g., a thermistor), an energy source (e.g., a primary energy source, a secondary energy source, direct current, alternating current, or a combination thereof), a power booster, a power converter (e.g., a DC/DC converter, an AC/AC converter, or a combination of both), one or more switches, one or more controllers, or a combination thereof. Preferably, the system includes a switch that switches the temperature controlled device between a primary energy source (e.g., a primary voltage and/or a primary current) and a secondary energy source (e.g., constant current, constant power, amplified voltage, or a combination thereof). The primary energy source may be from a battery, an alternator, a standard electrical outlet, or a combination thereof. The secondary energy source may be the primary energy source that is controlled, boosted, or both as discussed herein. More preferably, the system includes one or more switches that switch a temperature controlled device between a primary energy source and a secondary energy source.

The secondary energy source may function to rapidly increase the temperature of the heating device and adjacent areas, rapidly decrease the temperature of a cooling device and adjacent areas, or both. Preferably, the secondary energy source functions to rapidly (i.e., 60 seconds or less, or preferably 30 seconds or less) change (e.g., increase or decrease) the temperature of the temperature controlled device when the temperature controlled device has a temperature substantially equivalent to its ambient surroundings. The secondary energy source may be constant power source, constant current source, an amplified voltage source, or a combination thereof. For example, constant power may be applied to the heating device to maintain a heat output in a PTC heating device by adjusting voltage and subsequently current to compensate for an increase in resistance of the heater due to its PTC characteristics and provide a quicker heat up time than a system with a constant voltage source. In another example, constant current may be applied to the heating device so that as resistance of the heating device increases, the amount of power applied to the heating device increases until the maximum available voltage is used (e.g., up to 40 volts in a 12 volt system). In a third example, amplified voltage such as 24 volts or 36 volts in a 12 volt system may be applied to the heating device so that the heating device is heated more quickly. The secondary energy source as discussed herein may be the same as the boosted energy source. The secondary energy source may the same as the primary energy source. The secondary energy source may be powered by the primary energy source, from a power source discrete from the primary energy source, or a combination of both. Preferably, the secondary energy source and the primary energy source are different. The primary energy source may be a constant voltage, a constant current, or both. The constant voltage source may be any voltage source discussed herein for powering the heating device. The system may be switched from the secondary energy source to the primary energy source after the temperature controlled device and/or area that is temperature controlled achieves a predetermined temperature, after a predetermined amount of time, after a predetermined resistance is achieved, or a combination thereof.

The switch may function to switch between a primary energy source and a secondary energy source. The switch may be a mechanical switch, an electrical switch, an electronic switch, or a combination thereof. An example of an electric switch is a solenoid, a mercury switch, or both. An example of an electronic switch is a transistor, a solid state relay, a MOSFET transistor, or a combination thereof. An example of a mechanical switching device is a relay. The switch may function to electrically switch the system between two or more energy sources, two or more energy applications, or both. The switch may electrically and/or mechanically switch between two or more energy sources based upon a signal from a controller, a relay, a measuring device, or a combination thereof. Preferably, the switch switches between two or more energy sources when the switch receives a signal from a controller, a control unit, a relay, or a combination thereof.

The controller may function to control an electrical system. The controller may function to electrically control a switch based upon a signal received from a temperature sensor, a timer, a resistance sensor, or a combination thereof. The controller when turned off may send a signal to the switch as a default to begin the next operation switched to the secondary energy source. The controller may be discrete from the system. For example, the controller may be incorporated into a component including the temperature controlled device (e.g., a controller in a vehicle). Preferably, the controller is part of the system, although the controller may be located distal from the heating device, the cooling device, or both. The controller may be powered by alternating current, direct current, or both. Preferably, the controller is powered by direct current. The controller may function to regulate the amount of voltage, current, power, or a combination thereof being supplied to the heating device. The controller may include one or more voltage regulators, current regulators, power regulators, or a combination thereof. The controller may control using any device and/or method so that a temperature of the heating device may be maintained at a stable temperature, a user chosen temperature, a set-point, or a combination thereof. The controller may control using one or more look up tables. For example, the look up table may list a temperature of the device and/or area to be temperature controlled and a desired temperature and an energy output may be selected that most rapidly achieves the desired temperature. The controller may control using pulse width modulation. The pulse width modulation may turn the heater on for a duration and then turn the heater off for a duration so that a constant temperature is maintained. Based upon the desired temperature the duration the device is turned off may be increased or decreased so that a desired temperature is achieved and/or maintained. The pulse width modulation may be in addition to and/or in lieu of self-regulation characteristics that the heating device may include.

The voltage source may be any voltage source that adequately powers one or more components of the system. The voltage source may be a constant voltage source. Preferably, the voltage source as discussed herein is a vehicle battery, an alternator, or a vehicle battery and alternator. The voltage source may be a "12" volt system, a "24" volt system, a "42" volt system, a "120" volt system, or a combination thereof. The voltage of each voltage source may vary by ±10 percent or more, ±15 percent or more, ±20 percent or more, or about ±25 percent or more. The design, quality, age, or a combination thereof of a battery and/or alternator in a system may affect the range of the voltage source discussed herein. Thus for example, a 12 volt system may fluctuate from about 9 volts to about 15 volts or a 24 volt system may vary from about 18 volts to about 30 volts. Preferably, the voltage source vanes by about ±35 percent or less, or more preferably about ±30 percent or less, or more preferably by about ±28 percent or less. Preferably, the voltage source as discussed herein is 12 volt voltage source as produced by a vehicle: however, the voltage source may be a 24 volt source such as a truck, a 42 volt source such as an electric vehicle, or a 120 volt source such as a standard plug. The voltage source may be applied directly to the temperature controlled device, directly to a power booster, or both. Preferably, the voltage is connected to a switch and depending on the signal from the controller the switch applies the voltage directly to the heating device or the switch applies the voltage from the secondary energy source (i.e., the power booster) and the power booster applies the power to the heating device.

The power booster may be any device that applies a secondary energy source to the heating device. The power booster may function to vary the energy source, amplify the energy source, or both. The power booster may adjust the voltage, the current, the power, or a combination thereof to compensate for a change in resistance of the heating device so that the heating device rapidly increases in heat (i.e., in 60 seconds or less). The power booster may apply a voltage, a current, a power, or a combination thereof that is increased in comparison to an energy application from a standard source or a primary energy source. The power booster may include a regulator that increases the voltage, the current, the power, or a combination thereof over time so that the temperature of the heater is rapidly increased. The system may include one or more converters that amplify the voltage of the system so that the amplified voltage causes the heating device to heat rapidly.

The system, the controller, or both may include one or more converters that convert power from alternating current to direct current or vice versa, amplify voltage of the system, or a combination thereof. The one or more controllers may monitor and/or be connected to a constant power source, a constant current source, a constant voltage source, or a combination thereof. The one or more converters may be an AC to AC converter that amplifies the amount of voltage available to the heating device. The one or more converters may be an AC to DC converter or a DC to AC converter that amplifies the amount of voltage available to the heating device. Preferably, the one or more converters may be a DC to DC converter that amplifies the amount of voltage available to the heating device. The one or more converters may amplify the voltage by a factor of about 1.2 or more, about 1.5 or more, about 2 or more, about 3 or more, about 4 or more, or even about 5 or more. The one or more converters may amplify the voltage by a factor of about 10 or less, about 8 or less, or about 6 or less. For example, if 12 volts of power is supplied to the one or more converters, and the converter amplifies by a factor of 2, a 24 volt signal will be provided by the converter. The one or more converters may convert any of the voltage sources discussed herein. The amplified voltage may be created by a converter, a connector that connects two or more energy supplies in parallel, a connector that connects two or more energy supplies in series, or a combination thereof.

The connector may function to connect two or more energy sources in series so that voltage to the heating device is amplified. The connector may be the switch as discussed herein. The connector may connect a secondary energy source with the primary energy source in series so that the energy supplied to the heating device is amplified. For example, two batteries may be connected in series to provide an increased voltage. The connector may be switched on during the initial stages of running the temperature controlled device so that an amplified energy source is applied to the temperature controlled device. The connector may be switched off once one or more of the predetermined conditions and/or values (e.g., temperature, resistance, time) are achieved.

The device may switch from a secondary energy source to a primary power source when the heater achieves a predetermined condition such as temperature. The predetermined condition may be any temperature where the heating device produces sufficient heat so that heat is transferred to a user. The predetermined condition may be any temperature where the heating device provides sufficient heat transfer so that a user experiences warmth of the heater, but the temperature is low enough so that the heater is not damaged, the surrounding materials are not damaged, the user is not burned, or a combination thereof. The predetermined condition for a cooling device may be any temperature where the cooling device provides sufficient "heat transfer" so that a user experiences cool from the cooling device. The predetermined condition may be any temperature that is established by a set-point, a look-up table, a material characteristic, or a combination thereof. Preferably, the predetermined condition is a set-point that is provided in the system.

The predetermined condition when it is a predetermined temperature for a heater may be about 75° C. or more, about 80° C. or more about 85° C. or more, preferably about 90° C. or more, more preferably about 95° C. or more, even more preferably about 100° C. or more, or most preferably about 110° C. or more. Some types of heating devices may have a predetermined temperature of about 129° C. or more or even about 125° C. or more. The preferable predetermined set point may vary depending on the material characteristics of the heater. In one example, a predetermined temperature for a positive temperature coefficient (PTC) heater may be about 80° C. or more, about 85° C. or more, or about 95° C. or less. In another example, the predetermined temperature of a non-PTC heater may be about 100° C. or more, about 110° C. or more, about 120° C. or more, or about 140° C. or less. The predetermined temperature may be about 200° C. or less, about 150° C. or less, or about 130° C. or less. The predetermined temperature may be about 70 percent or more, about 80 percent or more, preferably about 90 percent or more, more preferably about 100 percent or more, even more preferably about 105 percent or more, or most preferably about 120 percent of the maximum temperature. For example, the predetermined temperature may exceed the maximum temperature so that so that a user experiences a heating sensation more rapidly (e.g., the controller overshoots the set point of the user).

The maximum temperature of the heater may be any temperature that provides sufficient heat to a user so that the user feels a warming sensation; the heating device provides therapeutic comfort; heat transfers through one or more layers; or a combination thereof. The maximum temperature may be any temperature where the heating device is not damaged, the surrounding layers are not damaged, the user is not injured, the user is not burned, or a combination thereof. The maximum temperature may be about 5° C. or more, about 10° C. or more, or even about 15° C. or more above a set point and/or predetermined temperature. The maximum temperature may be 5 percent or more, 10 percent or more, or even about 20 percent or more above a set point and/or predetermined temperature. Preferably, the maximum temperature is about 70° C. or more, about 80° C. or more, about 85° C. or more, about 90° C. or more, about 95° C. or more, about 100° C. or more, about 110° C. or more, about 120° C. or more, or even about 125° C. or more. The maximum temperature may be about 175° C. or less, about 150° C. or less, or about 130° C. or less. The maximum temperature may vary based upon the heating substrate of the heating device. For example, a heating device using a positive temperature coefficient material may have a maximum temperature of about 90° C. or less. In another example, a heating device using a resistance wire or Carbotex™ material may have a maximum temperature of about 130° C. or less or about 100° C. or less. The maximum temperature, the predetermined temperature, or both may be regulated by a timer, a resistance sensor, a temperature sensor, or a combination thereof.

A cooling device may provide a predetermined temperature of about 15° C. or less, about 10° C. or less, or about 5° C. or less. The cooling device may prove a predetermined temperature of about −20° C. or more, about −15° C. or more, or about −10° C. or more. The coding device may not cool a system, a part of a device proximate to a sensor, or both below a maximum cooling temperature. The maximum cooling temperature may be a temperature lower than a set point and/or predetermined temperature. The maximum cooling temperature may be about 5° C. below or more below or about 10° C. or more below a set point and/or predetermined temperature. The maximum cooling temperature may be about 10 percent below a set point and/or predetermined temperature or more or even about 20 percent below a set point and/or predetermined temperature or more. The predetermined temperature may vary based upon the type of cooling being used to cool a user. For example, the temperature of the cooling device may be lower when the cooled air is being moved by a circulation device. A timing device may be used to switch from a secondary energy device to a primary energy device so that rapid cooling may be achieved.

The timer may be any timer that measures time and at a predetermined time produces a signal that invokes a response. The timer may be an integral part of a controller, discrete from a controller, part of a heating device, part of a power booster, or a combination thereof. The timer may measure in any increment that allows the timer to assist in: controlling the heating device, switching between energy sources, invoking a response in the system, or a combination thereof. Preferably, the timer measures in seconds. The timer may generate a signal after any predetermined amount of time. The timer may monitor the amount of time that the secondary energy source, the power booster, or both is connected to the temperature controlled device. Preferably, the timer monitors the connection between the temperature controlled device and the secondary energy source, the power booster, or both for a predetermined amount of time.

The predetermined condition may be any amount of time so that heat and/or cold created by the heating device, the cooling device, or both is transferred through one or more layers and experienced by a user. The predetermined condition may be any amount of time so that the temperature controlled device (e.g., heater, cooling device, or both) achieves about 80 percent or more, preferably about 90 percent or more, more preferably about 95 percent or more, about 100 percent or more, or even about 105 percent or more the maximum temperature. The predetermined condition may be about 90 seconds or less, about 75 seconds or less, preferably about 60 seconds or less, more preferably about 45 seconds or less, even more preferably about 30 seconds or less, most preferably about 20 seconds or less. The predetermined condition may be about 5 seconds or more, about 10 seconds or more, or about 15 seconds or more. The timer after a predetermined amount of time may provide a signal to the switch discussed herein. The signal from the timer may switch the temperature controlled device between a secondary energy source, a primary energy source, or both. As discussed herein the predetermined temperature, the maximum temperature, or both may be regulated by resistance sensor.

The resistance sensor may be any sensor that monitors a resistance, a change in resistance, or both of the temperature controlled device. Preferably, the resistance sensor monitors the resistance of and/or change in resistance of a positive temperature coefficient (PTC) heating device, a negative temperature coefficient (NTC) heating device, a cooling device, or a combination thereof. The resistance sensor may monitor the change in resistance as the energy source is applied to the heating device, as the temperature of the heating device and/or cooling device changes, or both. The resistance sensor may be any device that measures the amount of resistance exhibited by the temperature controlled device so that when a predetermined resistance is achieved the sensor provides a signal to the controller, the one or more switches, or both so that the temperature controlled device is switched from a secondary energy source to a primary energy source. The resistance sensor may be an ohm meter, a resistance thermistor, a resistance temperature detector (RTD), or a combination thereof. The resistance sensor may correlate a resistance to a temperature or vice versa. The resistance sensor may be used in addition to a temperature sensor, in lieu of a temperature sensor, or as a form of a temperature sensor.

The temperature sensor may be any sensor that measures the temperature of the heating device, the temperature at an occupant contact area, the temperature on a contact surface, or a combination thereof. The temperature sensor may be any sensor that prevents the heating device from exceeding the rating of the heating device, damaging the heating device, melting the heater, melting one or more surfaces adjacent the heater, burning an occupant, causing frostbite to an occupant, or a combination thereof. The temperature sensor may be a contact temperature sensor, a non-contact temperature sensor, an optical temperature sensor, an electrical temperature sensor, or a combination thereof. Examples of temperature sensors that may be used are a thermistor, a thermal couple, a resistance thermometer, or a resistance temperature detector (RTD), a thermometer, a bimetallic temperature measuring device, or a combination thereof. Preferred temperature sensors may be electrically connected within the temperature control system, the heating device, the cooling device, or a combination thereof.

The performance of the system may be any performance as discussed herein. Preferably, the performance of the system may be graphically measured by plotting the increase in temperature of the heating device over time. A plot of the system during the initial stages of heating and/or cooling may form an angle of about 65 degrees or greater, preferably about 75 degrees or greater, more preferably about 80 degrees or greater, or even more preferably about 85 degrees or greater, or most preferably about 87 degrees or greater for about the first 5 seconds or more, about the first 7 seconds or more, about the first 10 seconds or more, or about the first 15 seconds or more. A plot of the system after the initial stages of heating and/or cooling may form an angle of about 30 degrees or more, preferably about 40 degrees or more, more preferably about 45 degrees or more, or even more preferably about 50 degrees or more, after the first 10 seconds or more, after the first 15 seconds or more, after the first 20 seconds or more, or after the first 25 seconds or more, but after about 75 seconds or less, about 60 seconds or less, or about 45 seconds or less (i.e., from about 10 seconds to about 50 seconds from an initial heating). Stated another way, the heating device may heat up at and/or the cooling device may cool down at a rate of about 3.0° C. or more/second, preferably about 3.5° C. or more/second, more preferably about 4.0° C. or more/second, even more preferably about 4.5° C. or more/second, even more preferably yet about 5.0° C. or more/second, or most preferably about 5.5° C. or more/second for about the first 8 seconds or more, about the first 10 seconds or more, about the first 12 seconds or more, or even about the first 15 seconds or more. The heating device may heat up at and/or the cooling device may cool down at a rate from about 3.0° C./second to about 10.0° C./second, from about 4.0° C./second to about 8.6° C./second, or from about 5.0° C./second to about 7.0° C./second for about the first 8 seconds or more, about the first 10 seconds or more, about the first 12 seconds or more, or about the first 15 seconds or more.

The heating device may heat at any rate and/or the cooling device may cool down at any rate so that the temperature of the area to be conditioned achieves a predetermined temperature, a maximum temperature, a predetermined temperature that is higher than the maximum temperature, or a combination thereof faster than current systems. The temperature controlled device may condition an area at a rate so that the area to be conditioned achieves a predetermined temperature, a maximum temperature, a predetermined temperature that is higher than the maximum temperature, or a combination thereof in about 75 seconds or less, in about 60 seconds or less, preferably in about 50 seconds or less, more preferably in about 40 seconds or less, even more preferably in about 30 seconds or less, even more preferably yet about 25 seconds or less, or most preferably in about 20 seconds or less. The control and accelerated thermal changes may be adjusted using a method as discussed herein.

The system taught herein may be used in a method to speed up the heating and/or cooling of a temperature controlled device. The method may include a step of connecting the temperature controlled device to a secondary energy source, a secondary amplified energy source, a primary energy source, or a combination thereof. Applying a secondary energy source, a secondary amplified energy source, a primary energy source, or a combination thereof. Switching between secondary energy source, a secondary amplified energy source, a primary energy source, or a combination thereof. Amplifying an energy source by one or more of the factors discussed herein. Measuring the temperature of the heating device, the cooling device, the component in including the heating device and/or cooling device, or a combination thereof. The method may include a step of switching after a predetermined temperature is achieved, a predetermined time, or both. The method may include a step of switching after 60 seconds or less, after 45 seconds or less, after 30 seconds or less, or about 20 seconds or less. The method may include a step of allowing a heating device to self-regulate, regulating with pulse width modulation, regulating with a controller, or a combination thereof. The method may include a step of heating and/or cooling to a maximum temperature, above a maximum temperature, 70 percent or more, 80 percent or more, 90 percent or more, or even 95 percent or more of a maximum temperature.

Figure 1:
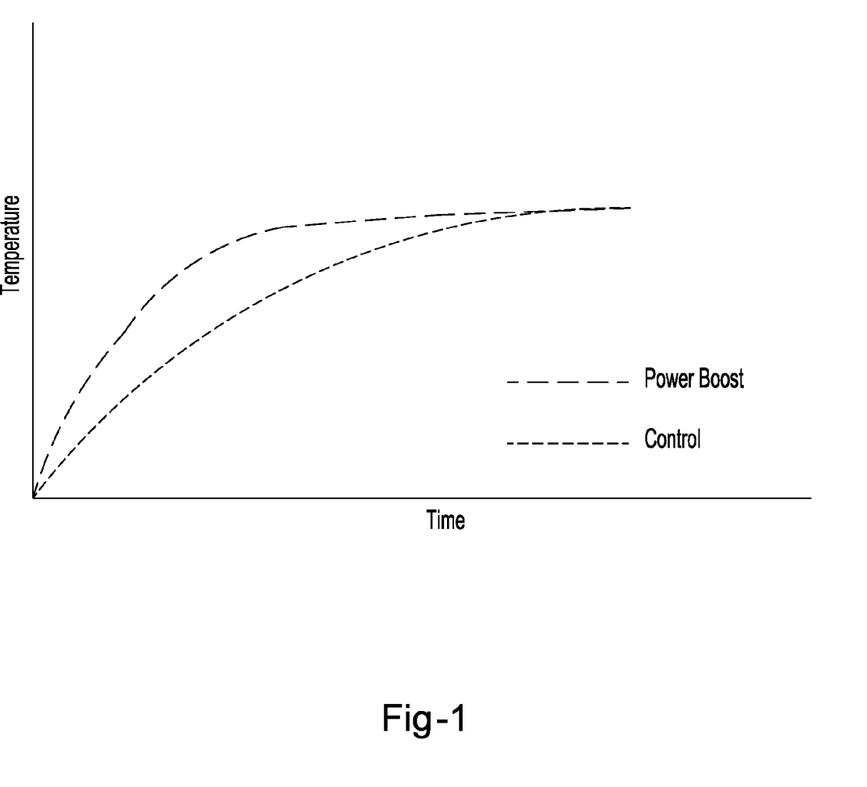
FIG. 1 illustrates an example of a temperature gradient of the teachings herein compared to a control.

FIG. 1 illustrates a temperature gradient of the teachings herein plotted against a control system. As illustrated, the heating system of the present teachings heats up faster so that temperature is realized by an occupant more quickly.

Figure 2:
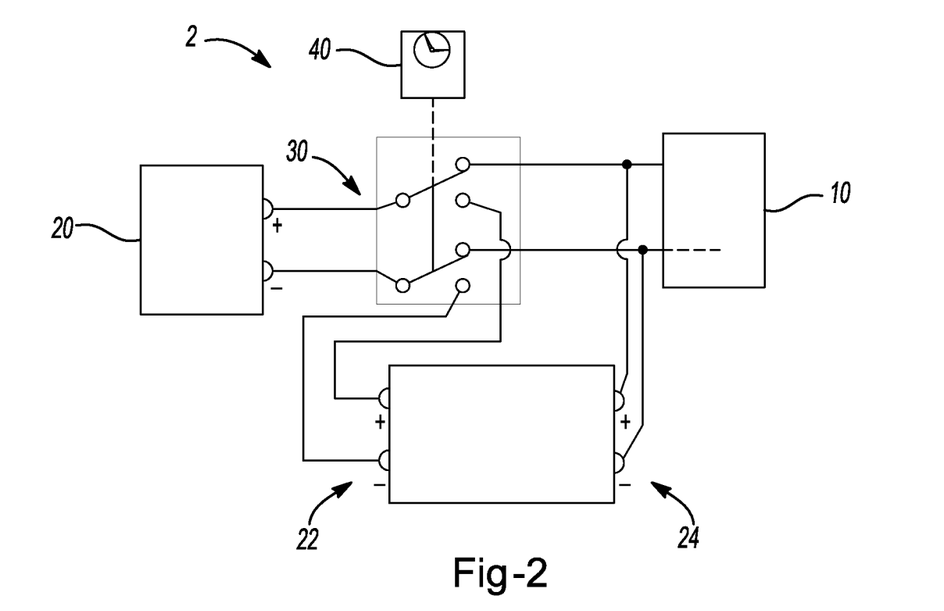
FIG. 2 illustrates an example of one control diagram.

FIG. 2 illustrates a possible control strategy for a temperature control system 2 of the teachings herein. The temperature control system 2 includes a temperature controlled device 10. The temperature controlled device 10 is connected to a primary energy source 20. The power from primary energy 20 goes through a power switch 30. When the power switch 30 is in the upper position the temperature controlled device 10 runs off of standard power from the primary source 20. When the power switch 30 is in a lower position the power is run through the power booster 22. The power booster 22 includes a converter 24 that regulates the boosted power and/or generated power. The power switch 30 during an initial start-up of the system passes power through the power booster 22 and converter 24 to the controlled device 10 and after a predetermined amount of time the timing relay 40 switches back to the power from the primary energy source.

Figure 3:
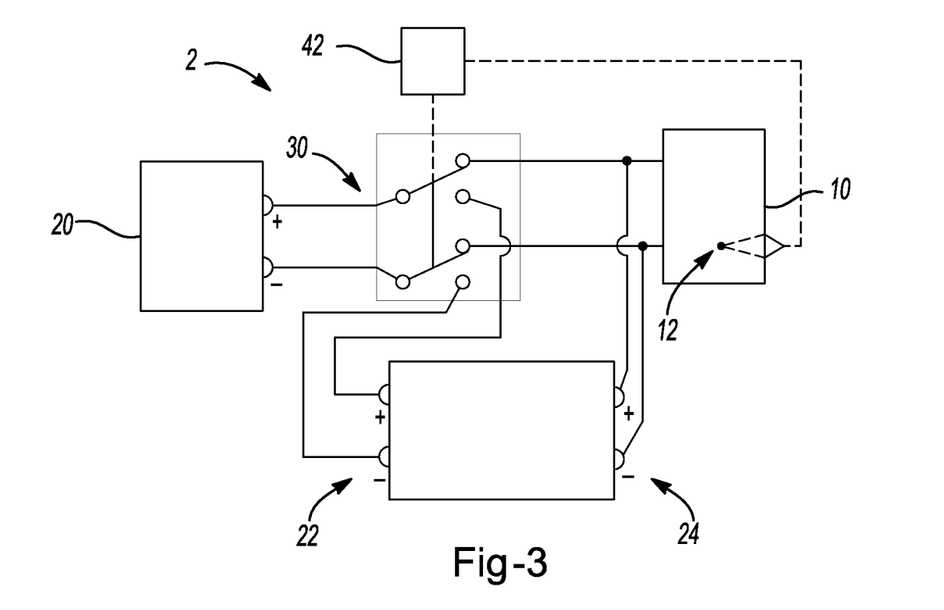
FIG. 3 illustrates another example of a control diagram.

FIG. 3 illustrates another possible control strategy for a temperature control system 2. The temperature control system 2 includes a temperature controlled device 10. The temperature controlled device 10 is connected to a primary energy source 20. The power from the primary energy source 20 goes through a power switch 30 to the temperature controlled device 10. When the power switch 30 is in the upper position the temperature controlled device 10 runs off of power from the primary source 20. When the power switch 30 is in the lower position the power is run through the power booster 22. The power booster 22 includes a converter 24 that regulates the power. The power switch 30 during an initial start-up of the system passes power through the power booster 22 and once the temperature controlled device 10 reaches a predetermined temperature as measured by the temperature sensor 12, the temperature relay 42 switches to the standard power from the primary energy source.

Figure 4:
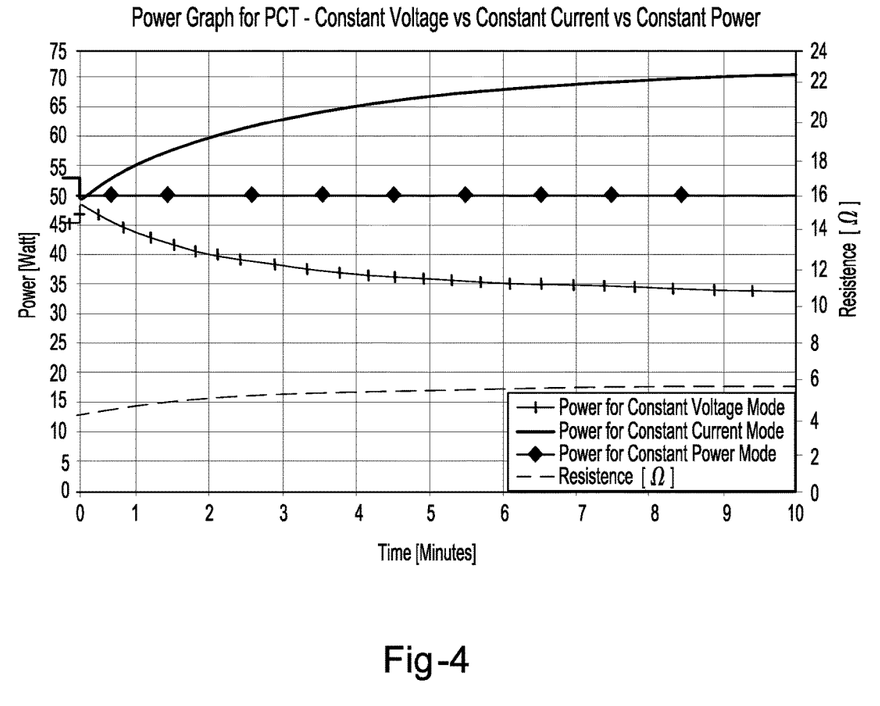
FIG. 4 illustrates various energy sources graphically depicted for a PTC (positive temperature coefficient) heating device.

FIG. 4 graphically illustrates three different energy applications over time plotted versus a change in resistance of a PTC heating device. The graph plots the amount of power applied to a heating device over a ten minute period of time. A constant current application of energy as illustrated, increases in power over time as resistance of the PTC heating device increases. The constant current application of energy pushes more power as resistance changes to the heating device temperature increases rapidly during power boost. A constant power application as illustrated provides a steady amount of power over time. The amount of power supplied to the heating device is regulated as resistance increases so that the amount of available power remains constant over the power boost heating. The constant voltage application as illustrated has a decrease in voltage over time as resistance increases. Constant voltage as illustrated will cause the heating device to heat the slowest and constant current will cause the heating device to heat the fastest as resistance of the heating device increases.

TABLE 1

| Method of Power Boost | Constant Current | | | | | |
|---|---|---|---|---|---|---|
| Heater type | FTC | | | Non-FTC | | |
| Switching Power Booster mode to Normal Operating Mode triggered by | time | Temperature | | time | Temperature | |
| Switched from Power Boost Mode to | Constant Voltage | Constant Voltage | Constant Current | Constant Voltage | Constant Voltage | Constant Current |
| Control Method after Switching to Normal Operating Mode | Self PMM Regulation | Self PMM Regulation | Constant Current Levels | PMM | PMM | Constant Current Level |

| Method of Power Boost | Constant Power | | | Amplified Voltage | | | |
|---|---|---|---|---|---|---|---|
| Heater type | FTC | | | FTC | | Non-FTC | |
| Switching Power Booster mode to Normal Operating Mode triggered by | time | Temperature | | time | Temperature | time | Temperature |
| Switched from Power Boost Mode to | Constant Voltage | Constant Voltage | Constant Power | Constant Voltage | Constant Voltage | Constant Voltage | Constant Voltage |
| Control Method after Switching to Normal Operating Mode | Self PMM Regulation | Self PMM Regulation | Constant Power Levels | Self PMM Regulation | Self PMM Regulation | PMM | PMM |

Table 1 illustrates examples of different energy applications that may be used to boost heating and/or cooling. Table 1 illustrates the type of energy application during a boost mode and then the type of regulation of temperature once boost mode is complete. The type of control required when the boost mode complete depends on the type of temperature controlled device used to produce heat and/or cooling.

A heating system comprising: (a) a heating device; (b) an electronic device, an electro-mechanical device, or both comprising: (i) a secondary constant energy source, an secondary amplified energy source, or both; (ii) a primary constant energy source; (iii) a mechanical switching device, an electrical switching device, or both; (iv) a measuring device; and (v) optionally a controller; wherein the heating device is connected to the secondary constant energy source, the secondary amplified energy source, or both when the heating device is turned on; wherein the measuring device measures a predetermined condition, and the mechanical switching device, the electrical switching device, or both switches from to the secondary constant energy source, the secondary amplified energy source, or both to the primary constant energy source when the heating device achieves the predetermined condition; and wherein the predetermined condition is achieved in about 60 seconds or less.

A method comprising: (a) applying a constant energy source or an amplified energy source to a heating device in a heating system; (b) monitoring one or more conditions of the heating device; (c) disconnecting the heating device from the constant energy source or the amplified energy source when the one or more of the conditions achieves a predetermined value; (d) connecting the heating device to a different constant energy source so that the heating device continued to be heated; wherein heating device is disconnected from the constant energy source or the amplified energy source after about 60 seconds or less; and wherein the heating device is self-regulating, the heating device is connected to a controller that regulates the temperature of the heater, or both so that when the heating device is connected to the different constant energy source the heating device maintains a pre-set temperature, a user selected temperature, or both.

A heating device having positive temperature coefficient characteristics comprising: an electronic device, an electro-mechanical device, or both comprising: (i) a constant current power source; (ii) a timer, a thermistor, temperature sensor, or a combination thereof; and (iii) a mechanical switching device, an electronic switching device, or both; wherein the constant current power source provides an initial power boost to the heating device and after a predetermined period of time, a predetermined resistance, a predetermined temperature, or a combination thereof the switching device switches from the constant current power source to a primary constant voltage power source so that the heating device self-regulates and controls a temperature of the heating device.

A method comprising: (a) applying power to a heating device having positive temperature coefficient characteristics; (b) providing constant current power source at a sufficient level so that the heating device achieves a desired temperature in a short period of time, preferably the period of time is 60 seconds or less; (c) disconnecting the heating device from the constant current power source after a predetermined period of time, a predetermined resistance, a predetermined temperature, or a combination thereof; and (d) connecting the heating device to a primary constant voltage power source after the heating device is disconnected from the constant current power source; wherein the positive temperature coefficient characteristics maintains the heating device at a desired running temperature.

A heating device having positive temperature coefficient characteristics comprising: (1) an electronic device, an electro-mechanical device, or both comprising: (i) a constant current power source; (ii) a timer, a thermistor, temperature sensor, or a combination thereof; (iii) a mechanical switching device, an electronic switching device, or both; and (iv) an electronic control unit (e.g., using pulse width modulation); wherein the constant current power source provides an initial power boost to the heating device and after a predetermined period of time, a predetermined resistance, a predetermined temperature, or a combination thereof the switching device switches from the constant current power source to a primary constant voltage power source and the electronic control unit controls a temperature of the heating device.

A method comprising: (a) applying power to a heating device having positive temperature coefficient characteristics; (b) providing constant current power source at a sufficient level so that the heating device achieves a desired temperature in a short period of time, preferably the period of time is 60 seconds or less; (c) disconnecting the heating device from the constant current power source after a predetermined period of time, a predetermined resistance, a predetermined temperature, or a combination thereof; and (d) connecting the heating device to a primary constant voltage power source after the heating device is disconnected from the constant current power source; wherein a temperature of the heating device is maintained, varied, or both using the electronic control unit (e.g., using a pulse width modulated signal) when a primary constant voltage is applied.

A heating device having non-positive temperature coefficient characteristics comprising: (1) an electronic device, an electro-mechanical device, or both comprising: (i) a constant current power source; (ii) a timer, a thermistor, temperature sensor, or a combination thereof; and (iii) a mechanical switching device, an electronic switching device, or both; (iv) an electronic control unit (e.g., using pulse width modulation); wherein the constant current power source provides an initial power boost to the heating device and after a predetermined period of time, a predetermined resistance, a predetermined temperature, or a combination thereof the switching device switches from the constant current power source to a primary constant voltage power source and the electronic control unit (e.g., using a pulse width modulated signal) controls a temperature of the heating device.

A method comprising: (1) applying power to a heating device having non-positive temperature coefficient characteristics; (2) providing constant current from a secondary constant current power source at a sufficient level so that the heating device achieves a desired temperature, overshoots the desired temperature (i.e., by about 60 percent or less, preferably by about 40 percent or less, or about 20 percent or less) in a short period of time, preferably the period of time is 60 seconds or less; (3) disconnecting the heating device from the secondary constant current power source after a predetermined period of time, a predetermined resistance, a predetermined temperature, or a combination thereof; and (4) connecting the heating device to a primary constant voltage power source after the heating device is disconnected from the secondary constant current power source; wherein a temperature of the heating device is maintained, varied, or both using the electronic control unit (e.g., using a pulse width modulated signal) when a primary constant voltage is applied.

A heating device having positive temperature coefficient characteristics comprising: (1) an electronic device, an electro-mechanical device, or both comprising: (i) a constant current power source; (ii) a timer, a thermistor, temperature sensor, or a combination thereof; and (iii) a mechanical switching device, an electronic switching device, or both; wherein the constant current power source provides an initial power boost to the heating device and after a predetermined period of time, a predetermined, a predetermined temperature, or a combination thereof the switching device switches from the constant current power source to a primary constant current power source so that an amount of current provided to the heating device controls a temperature of the heating device.

A method comprising: (1) applying power to a heating device having positive temperature coefficient characteristics; (2) providing constant current power source at a sufficient level so that the heating device achieves the desired temperature in a short period of time, preferably the period of time is 60 seconds or less; (3) disconnecting the heating device from the constant current power source after a predetermined period of time, a predetermined resistance, a predetermined temperature, or a combination thereof; and (4) connecting the heating device to a primary constant current power source after the heating device is disconnected from the constant current power source; wherein the constant amount of power provided from the primary constant current power source maintains the heating device at a desired running temperature.

A heating device having non-positive temperature coefficient characteristics comprising: (1) an electronic device, an electro-mechanical device, or both comprising: (i) a constant current power source; (ii) a timer, a thermistor, temperature sensor, or a combination thereof; and (iii) a mechanical switching device, an electronic switching device, or both; wherein the constant current power source provides an initial power boost to the heating device and after a predetermined period of time, a predetermined resistance, a predetermined temperature, or a combination thereof the switching device switches from the constant current power source to a primary constant current power source so that an amount of current provided to the heating device controls a temperature of the heating device.

A method comprising: (1) applying power to a heating device having non-positive temperature coefficient characteristics; (2) providing constant current from a secondary constant current power source at a sufficient level so that the heating device achieves the desired temperature in a short period of time, preferably the period of time is 60 seconds or less; (3) disconnecting the heating device from the secondary constant current power source after a predetermined period of time, a predetermined resistance, a predetermined temperature, or a combination thereof; and (4) connecting the heating device to a primary constant current power source after the heating device is disconnected from the secondary constant current power source; wherein the constant amount of power provided from the primary constant current power source maintains the heating device at a desired running temperature.

A heating device having positive temperature coefficient characteristics comprising: (1) an electronic device, an electro-mechanical device, or both comprising: (i) a constant power source; (ii) a timer, a thermistor, temperature sensor, or a combination thereof; and (iii) a mechanical switching device, an electronic switching device, or both; wherein the constant power source provides an initial power boost to the heating device and after a predetermined period of time, a predetermined resistance, a predetermined temperature, or a combination thereof the switching device switches from the constant power source to a primary constant voltage power source so that the heating device self-regulates and controls a temperature of the heating device.

A method comprising: (1) applying power to a heating device having positive temperature coefficient characteristics; (2) providing a constant power source at a sufficient level so that the heating device achieves the desired temperature in a short period of time, preferably the period of time is 60 seconds or less; (3) disconnecting the heating device from the constant power source after a predetermined period of time, a predetermined resistance, a predetermined temperature, or a combination thereof; and (4) connecting the heating device to a primary constant voltage power source after the heating device is disconnected from the constant power source; wherein the positive temperature coefficient characteristics maintains the heating device at a desired running temperature.

A heating device having positive temperature coefficient characteristics comprising: (1) an electronic device, an electro-mechanical device, or both comprising: (i) a constant power source; (ii) a timer, a thermistor, temperature sensor, or a combination thereof; and (iii) a mechanical switching device, an electronic switching device, or both; (iv) an electronic control unit (e.g., using pulse width modulation); wherein the constant power source provides an initial power boost to the heating device and after a predetermined period of time, a predetermined resistance, a predetermined temperature, or a combination thereof the switching device switches from the constant power source to a primary constant voltage power source and the electronic control unit controls a temperature of the heating device.

A method comprising: (1) applying power to a heating device having positive temperature coefficient characteristics; (2) providing constant power from a secondary power source at a sufficient level so that the heating device achieves the desired temperature in a short period of time, preferably the period of time is 60 seconds or less; (3) disconnecting the heating device from the secondary constant power source after a predetermined period of time, a predetermined resistance, a predetermined temperature, or a combination thereof; and (4) connecting the heating device to a primary constant voltage power source after the heating device is disconnected from the secondary constant power source; wherein a temperature of the heating device is maintained, varied, or both using the electronic control unit (e.g., using a pulse width modulated signal) when a primary constant voltage is applied.

A heating device having positive temperature coefficient characteristics comprising: (1) an electronic device, an electro-mechanical device, or both comprising: (i) a constant power source; (ii) a timer, a thermistor, temperature sensor, or a combination thereof; and (iii) a mechanical switching device, an electronic switching device, or both; wherein the constant power source provides an initial power boost to the heating device and after a predetermined period of time, a predetermined resistance, a predetermined temperature, or a combination thereof the switching device switches from the constant power source to a primary constant current power source so that an amount of current provided to the heating device controls a temperature of the heating device.

A method comprising: (1) applying power to a heating device having positive temperature coefficient characteristics; (2) providing constant power from a secondary constant power source at a sufficient level so that the heating device achieves the desired temperature in a short period of time, preferably the period of time is 60 seconds or less; (3) disconnecting the heating device from the secondary constant power source after a predetermined period of time, a predetermined resistance, a predetermined temperature, or a combination thereof; and (4) connecting the heating device to a primary constant current power source after the heating device is disconnected from the secondary constant power source; wherein the constant amount of power provided from the primary constant current power source maintains the heating device at a desired running temperature.

A heating device having positive temperature coefficient characteristics comprising: (1) an electronic device, an electro-mechanical device, or both comprising: (i) an amplified voltage source; (ii) a timer, a thermistor, temperature sensor, or a combination thereof; and (iii) a mechanical switching device, an electronic switching device, or both; wherein the amplified voltage source provides an initial power boost to the heating device and after a predetermined period of time, a predetermined resistance, a predetermined temperature, or a combination thereof the switching device switches from the amplified voltage source to a primary constant voltage power source so that the heating device self-regulates and controls a temperature of the heating device.

A method comprising: (1) applying power to a heating device having positive temperature coefficient characteristics; (2) providing an amplified voltage source at a sufficient level so that the heating device achieves the desired temperature in a short period of time, preferably the period of time is 60 seconds or less; (3) disconnecting the heating device from the amplified voltage source after a predetermined period of time, a predetermined resistance, a predetermined temperature, or a combination thereof; and (4) connecting the heating device to a primary constant voltage power source after the heating device is disconnected from the amplified voltage source; wherein the positive temperature coefficient characteristics maintains the heating device at a desired running temperature.

A heating device having positive temperature coefficient characteristics comprising: (1) an electronic device, an electro-mechanical device, or both comprising: (i) an amplified voltage source; (ii) a timer, a thermistor, temperature sensor, or a combination thereof; and (iii) a mechanical switching device, an electronic switching device, or both; (iv) an electronic control unit (e.g., using pulse width modulation); wherein the amplified voltage source provides an initial power boost to the heating device and after a predetermined period of time, a predetermined resistance, a predetermined temperature, or a combination thereof the switching device switches from the amplified voltage source to a primary constant voltage power source and the electronic control unit controls a temperature of the heating device.

A method comprising: (1) applying power to a heating device having positive temperature coefficient characteristics; (2) providing an amplified voltage source at a sufficient level so that the heating device achieves the desired temperature in a short period of time, preferably the period of time is 60 seconds or less; (3) disconnecting the heating device from the amplified voltage source after a predetermined period of time, a predetermined resistance, a predetermined temperature, or a combination thereof; and (4) connecting the heating device to a primary constant voltage power source after the heating device is disconnected from the amplified voltage source; wherein a temperature of the heating device is maintained, varied, or both using the electronic control unit (e.g., using a pulse width modulated signal) when a primary constant voltage is applied.

A heating device having non-positive temperature coefficient characteristics comprising: (1) an electronic device, an electro-mechanical device, or both comprising: (i) an amplified voltage power source; (ii) a timer, a thermistor, temperature sensor, or a combination thereof; and (iii) a mechanical switching device, an electronic switching device, or both; (iv) an electronic control unit (e.g., using pulse width modulation); wherein the amplified voltage power source provides an initial power boost to the heating device and after a predetermined period of time, a predetermined resistance, a predetermined temperature, or a combination thereof the switching device switches from the amplified voltage power source to a primary constant voltage power source and the electronic control unit (e.g., using a pulse width modulated signal)) controls a temperature of the heating device.

A method comprising: (1) applying power to a heating device having non-positive temperature coefficient characteristics; (2) providing an amplified voltage power source at a sufficient level so that the heating device achieves the desired temperature in a short period of time, preferably the period of time is 60 seconds or less; (3) disconnecting the heating device from the amplified voltage power source after a predetermined period of time, a predetermined resistance, a predetermined temperature, or a combination thereof; and (4) connecting the heating device to a primary constant voltage power source after the heating device is disconnected from the amplified voltage power source; wherein a temperature of the heating device is maintained, varied, or both using the electronic control unit (e.g., using a pulse width modulated signal) when a primary constant voltage is applied.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for ail purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A system comprising:
   a) a temperature controlled device that is a heating device that provides heating and/or a cooling device that provides cooling;
   b) a primary energy source supplying primary energy to the temperature controlled device;
   c) an electronic device, an electro-mechanical device, or both comprising:
      i) a secondary energy source connected to the primary energy source, the secondary energy source supplying secondary energy to the temperature controlled device;
      ii) a switching device;
      iii) a measuring device; and
      iv) a controller;
   wherein the secondary energy source includes a power booster and a converter that amplifies a voltage output from the primary energy source, the secondary energy comprises the amplified voltage of the primary energy;
   wherein the temperature controlled device is connected to the secondary energy source when the temperature controlled device is initially turned on so that the secondary energy is supplied to the temperature controlled device;
   wherein after the measuring device measures a predetermined condition of the temperature controlled device, the switching device disconnects the secondary energy source from the primary energy source so that only the primary energy is supplied to the temperature controlled device;
   wherein when the secondary energy source is connected to the first energy source so that the secondary energy is supplied to the temperature controlled device, a temperature of the heating device is increased or a temperature of the cooling device is decreased;
   wherein after the predetermined condition of the temperature controlled device is measured and the switching device disconnects the secondary energy source from the primary energy source so that only the primary energy is supplied to the temperature controlled device, the temperature of the heating device or the temperature of the cooling device is maintained at a pre-set temperature, a user selected temperature, or both with the primary energy; and
   wherein the predetermined condition is achieved in about 60 seconds or less.

2. The system of claim 1, wherein the temperature controlled device when connected to the primary energy source is connected to the controller and the controller regulates a temperature of the temperature controlled device.

3. The system of claim 1, wherein the temperature controlled device has positive temperature coefficient characteristics and self-regulates when connected to the primary energy source.

4. The system of claim 1, wherein the secondary energy source is a constant current source, and
   wherein the temperature controlled device is a part of an automobile seat.

5. The system of claim 1, wherein the predetermined condition is about 70 percent or more, of a maximum temperature of the temperature controlled device.

6. The system of claim 1, wherein the predetermined condition is achieved in about 45 seconds or less.

7. The system of claim 1, wherein the temperature controlled device is a cooling device that is a thermoelectric device that is in communication with a blower or is a blower.

8. The system of claim 4, wherein the predetermined condition is about 105 percent or more of a maximum temperature of the temperature controlled device.

9. The system of claim 1, wherein the temperature controlled device is a non-positive temperature coefficient heating device.

10. The system of claim 1, wherein the primary energy source is regulated using pulse width modulation.

11. The system of claim 1, wherein the temperature controlled device is both the heating device that provides heating and the cooling device that provides cooling.

12. A method comprising:
a) applying secondary energy from a secondary energy source to a temperature controlled device in a system, the temperature controlled device is a heating device that provides heating and/or a cooling device that provides cooling;
b) monitoring one or more conditions of the temperature controlled device;
c) disconnecting the temperature controlled device from the secondary energy source when the one or more of the conditions achieves a predetermined value;
d) connecting the temperature controlled device to a primary energy source so that power from the primary energy source is supplied to the temperature controlled device so that the temperature controlled device continues to control temperature;
wherein temperature controlled device is disconnected from the secondary energy source in about 60 seconds or less;
wherein the temperature controlled device is a self-regulating heating device;
the temperature controlled device is connected to a controller that regulates the temperature of the temperature controlled device; or a combination of both so that when the temperature controlled device is connected to the primary energy source the temperature controlled device maintains a pre-set temperature, a user selected temperature, or both;
wherein the secondary energy source includes a power booster and a converter that boosts the power output from the primary energy source by amplifying voltage of the power so that a temperature of the heating device is increased when the secondary energy source is connected to the first energy source, or a temperature of the cooling device is decreased when the secondary energy source is connected to the primary energy source, the secondary energy comprises the boosted power;
wherein after a measuring device measures a predetermined condition of the temperature controlled device, a switching device disconnects the secondary energy source from the primary energy source so that only the power from the primary energy source is supplied to the temperature controlled device; and
wherein the temperature controlled device is a part of an automobile seat.

13. The method of claim 12, wherein the one or more conditions of the temperature controlled device are time, resistance, temperature, or a combination thereof.

14. The method of claim 12, wherein the secondary energy source is a constant current source, a constant power source, an amplified energy source, or a combination thereof.

15. The method of claim 12, wherein the temperature controlled device is a cooling device and the cooling device is a thermoelectric device, a fan, or both.

16. The method of claim 12, wherein the temperature controlled device has positive temperature coefficient characteristics.

17. The method of claim 12, wherein the system includes a switch that switches the temperature controlled device between the secondary energy source and the primary energy source.

18. The method of claim 12, wherein the one or more conditions is about 70 percent or more of a maximum temperature of the temperature controlled device.

19. The method of claim 12, wherein the one or more conditions is about 105 percent or more of a maximum temperature of the temperature controlled device.

20. The method of claim 12, wherein the one or more conditions is achieved in about 45 seconds or less, or the one or more conditions is achieved in about 20 seconds or less.

* * * * *